(12) United States Patent
Buttau et al.

(10) Patent No.: US 7,198,424 B2
(45) Date of Patent: Apr. 3, 2007

(54) CONNECTING ELEMENT, AND MOUNTING ASSEMBLY USING THE SAME

(75) Inventors: Hans-Peter Buttau, Lauffen (DE); Uwe Kaiser, Waiblingen (DE)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 10/979,473

(22) Filed: Nov. 2, 2004

(65) Prior Publication Data
US 2005/0095060 A1 May 5, 2005

(30) Foreign Application Priority Data
Nov. 4, 2003  (DE) ................ 103 51 395

(51) Int. Cl.
*F16B 12/10* (2006.01)
(52) U.S. Cl. .............. 403/341; 403/286; 403/292
(58) Field of Classification Search .......... 403/53, 403/286, 292–295, 297, 329, 341, 397, 387; 256/25; 160/135
See application file for complete search history.

(56) References Cited

U.S. PATENT DOCUMENTS

| | | | | |
|---|---|---|---|---|
| 4,402,118 A | * | 9/1983 | Benedetti | 24/289 |
| 4,865,505 A | * | 9/1989 | Okada | 411/512 |
| 5,403,034 A | * | 4/1995 | Gans et al. | 280/728.3 |
| 5,533,237 A | * | 7/1996 | Higgins | 24/289 |
| 6,125,600 A | * | 10/2000 | Bastian | 52/220.7 |
| 6,185,887 B1 | * | 2/2001 | Strassle | 52/282.2 |
| 6,381,811 B2 | * | 5/2002 | Smith et al. | 24/289 |
| 6,691,380 B2 | * | 2/2004 | Vassiliou | 24/295 |

FOREIGN PATENT DOCUMENTS

| | | |
|---|---|---|
| AT | 200313 | 10/1958 |
| DE | 6752160 | 2/1969 |
| DE | 28 20 306 | 11/1979 |
| DE | 295 16 689 U1 | 2/1996 |
| DE | 101 28 748 | 1/2003 |
| FR | 89541 | 7/1967 |
| FR | 2 120 440 | 8/1972 |
| FR | 2 526 918 | 11/1983 |
| WO | 01/06073 | 1/2001 |

* cited by examiner

*Primary Examiner*—Daniel P. Stodola
*Assistant Examiner*—Joshua T. Kennedy
(74) *Attorney, Agent, or Firm*—Michael J. Striker

(57) ABSTRACT

A connecting element with substantially U-shaped cross-section has a U-shape having two free ends and a connecting region connecting the free ends with one another and having at least one engaging element provided and formed to engage an associated edge of an undercut groove of a first part to be connected by the connecting element, the U shape having at least one second engaging element located near one of the free ends and provided and formed to laterally engage in an associated recess of a second part to be connected by the connecting element, wherein the at least one second engaging element protrudes from an associated one of the free ends of the U shape in a direction away from the other of the free ends of the U shape.

29 Claims, 4 Drawing Sheets

CONNECTING ELEMENT, AND MOUNTING ASSEMBLY USING THE SAME

BACKGROUND OF THE INVENTION

The present invention relates to a connecting element and a mounting assembly using the same.

More particularly, it relates to a connecting element which has a substantially U-shaped cross-section, wherein both free ends of the U shape are connected with one another by a connecting region having at least one first engaging element provided and designed so that it engages an associated edge of an undercut groove of a first part to be connected by the connecting element, and the U shape has at least one second engaging element located close to its free ends and provided and designed so that it laterally engages in an associated recess of a second part to be connected by the connecting element.

Such connecting elements are used for example to set up production rooms, for example break rooms, machine enclosures, clean rooms and the like. Also, such connecting elements are used in trade show set-up and for covering of supporting profiles and the like.

German utility model DE 295 16689 U1 discloses for example a connecting element for applying a covering profile on a profile rod. The profile rod has an undercut groove, in which the connecting region of the connecting element is inserted. Furthermore, a mounting foot is provided on the covering profile with two lateral recesses, in which two second engaging elements associated with the free ends of the U shape engage as tongs. For realization of this tong-like engagement, the free ends of the U shape face toward one another.

The disadvantage of the known connecting element is that a dismounting of both parts to be connected with one another is practically not possible, since the tong-like engagement of the second engaging elements in the lateral recesses of the mounting foot of the coating profile is secured by the lateral abutment of the side leg of the U-shape against the edges of the undercut groove, or such a dismounting is possible only in applications with small holding force, in which the form-locking (positive) connection can be lifted by elastic or plastic deformation of the connecting element.

SUMMARY OF THE INVENTION

Accordingly, it is an object of the present invention to provide a connecting element of the above mentioned general type, which avoids the disadvantages of the prior art.

More particularly, it is an object of the present invention to provide a connecting element, which is formed so that despite a simple mounting of the both parts to be connected and a high holding force of these both parts on one another, a dismounting of both parts is possible in a simple manner.

In keeping with these objects and with others which will become apparent hereinafter, one feature of the present invention resides, briefly stated, in a connecting element, in which the at least one second engaging element protrudes from the free end of the U shape associated with it, in a direction away from the other free end of the U shape.

While in the following description a connecting element is described, which is formed substantially mirror-symmetrical relative to the longitudinal central plane of the U shape, it should be mentioned that it is only a preferred embodiment of the invention and the connecting element can be also formed not mirror-symmetrical.

The connection of both parts to be connected with one another can be performed in the following manner:

First, both free ends of the U shape are compressed and the second engaging elements are guided between both lateral recesses of the second part to be connected. Then, both free ends of the U shape are released and the second engaging elements can engage in the lateral recesses of the second part to be connected. The thusly premounted assembly is guided on the first part to be connected until the connecting element engages with its connecting region in the undercut groove. Now the second part to be connected has to be pressed on the first part to be connected until the first engaging elements of the connecting region of the U shape engage the edges of the undercut groove. In this finally mounted condition of the mounting assembly composed of both parts to be connected and the connecting element, both parts to be connected are reliably mounted on one another on one hand by the engagement of the edges of the undercut groove by the first engaging elements and on the other hand by the engagement of the second engaging elements of the lateral recesses of the second part to be connected.

For dismounting of both parts to be connected with one another, there are several possibilities.

A first possibility resides in that a spatula-like tool is introduced laterally between both parts to be connected until it acts on the free end of one lateral leg of the U shape. By means of the spatula-like tool then the second engaging element associated with this free end of the U shape can be moved from the lateral recess of the second part to be connected. By lifting the edge of the second part to be connected, which edge is associated with this recess, from the first part to be connected, it can be prevented that with pulling back of the spatula-like tool the second engaging element snaps again into the lateral recess of the second part to be connected. Frequently, such a lifting is not required, since the second engaging element is pulled back by the pretensioning of the engagement between the first engaging element and the undercut groove of the second part to be connected as long as it was moved out of the lateral recess. Moreover, with the third engaging element which will be discussed herein below, it is possible to prevent that the second engaging element moves back in undesirable manner again into the lateral recess.

Then the above described releasing process can be repeated on the other side of the second part to be connected, to release there the second engaging element of the connecting element from the associated lateral recess of the second part to be connected. Now the connecting element is located in engagement with the undercut groove of the first part to be connected only with its connecting region. This engagement can be released however in a simple manner by compressing the free ends of the lateral legs of the U shape, so that the connecting element can be pulled out from the undercut groove without problems. Alternatively, it is also possible to release the first engaging element from the undercut groove with use of a suitable tool, for example a hexagon wrench.

The above described releasing of the engagement of the second engaging elements from the lateral recesses of the second part to be connected can be performed also with the use of two spatula-like tools at the same time.

In accordance with a second possibility, both parts to be connected can be released from one another without the use of a tool. First the second part to be connected is displaced relative to the first part to be connected laterally. Then, the side leg of the U shape of the connecting element, which runs forward in the displacement direction, reaches the abutment against the edge of the undercut groove of the first part to be connected. During a further lateral displacement of the second part to be connected, this free leg bends in the course of this abutment, so that the second engaging element of the connecting element associated with this leg is moved out of the associated lateral recess of the second part to be connected. By subsequent lifting of the associated edge of the second part to be connected, when required, for example when the above described pretensioning of the engagement of the first engaging element with the undercut groove is not sufficient, it can be prevented that by moving back the second part to be connected relative to the first part to be connected, the second engaging element of the connecting element is guided back again into the lateral recess. Subsequently, the second part to be connected is displaced relative to the first part to be connected in the opposite direction, for releasing the other second engaging element from the associated lateral recess of the second part to be connected. The lifting of the engagement between the connecting element and the first part to be connected is performed as described in the explanation of the first dismounting possibility.

For using the inventive connecting element for mounting and dismounting of the both parts to be connected repeatedly, it is advantageous when it is elastic, preferably resilient. For this purpose the connecting element can be composed for example of metal, advantageously spring steel, or plastic. An especially cost favorable manufacture of the inventive connecting element can be obtained when it is formed as a stamped or bent part.

The securing of the engagement between the connecting element and the first element to be connected can be increased, when in accordance with the present invention at least one first engaging element is associated with each of both edges of the undercut groove, preferably T-shaped, of the first part to be connected.

The at least one first engaging element can include for example an engaging tong, which protrudes outwardly from the U shape in a direction facing toward the free ends of the U shape. This engaging tong forms a type of a barb which engages the edge of the undercut groove of the first part to be connected and spreads in it to prevent a release of the connecting element from the undercut groove.

For further increase of the security of the engagement of the connecting element with the first part to be connected, a plurality of engaging tongs can be associated with at least one edge of the undercut groove of the first part to be connected.

At least two of the engaging tongs can have a different length, to compensate for great manufacturing tolerances of both parts to be connected, in particular of the undercut groove of the first part to be connected. Also, when because of high manufacturing tolerances the corresponding longer of both tongs can no longer engage the undercut groove, then the connecting element can be mounted on the first part to be connected at least by the corresponding shorter of both tongs.

When the engaging tongs further have a symmetrical length distribution relative to the longitudinal center of the connecting element, an engaging surface of a crown type can be formed between the connecting element and the first part to be connected, which in case of a certain tilting of the connecting element relative to the first part to be connected, guarantees a reliable engagement between both these members.

For increasing the security of the engagement between the connecting element and the second part to be connected it is proposed that at least one second engaging element is associated with each of the free ends of the U shape.

The second engaging element in a simple manner can be realized in that it is formed by an edge portion of the free end of the U shape which is advantageously bent. For increasing the security of the engagement between the connecting element and the second part to be connected, it is further proposed that the edge portion extends substantially over the total length of the connecting element.

For improving the hold of the second engaging element in the lateral recess of the second part to be connected, it is proposed that at least one third engaging element is provided on at least one of the free ends of the U shape, that encloses with the second engaging element a predetermined angle, for example between substantially 70° and substantially 140°. By the cooperation of the second and third engaging elements, the associated free ends of the U shape more reliably spread in the lateral recess of the second part to be connected. At least one third engaging element can be formed by a projection, which extends substantially in the direction of elongation of the lateral leg of the U shape associated with this free end. Preferably, a third engaging element is provided on at least one longitudinal end of one of the free ends of the U shape.

It is another objective of the present invention to provide a mounting assembly which is composed of two parts to be connected and a connecting element formed in accordance with the present invention. Further embodiment possibilities and advantages provided by them can be realized from the above presented description of the inventive connecting element.

The parts to be connected, for example at least the first part to be connected, can be composed of light metal or a light metal alloy, preferably aluminum or an aluminum alloy. It is also possible to produce the both parts to be connected, preferably at least the second part to be connected, of a plastic. In both cases in view of the manufacturing cost of the inventive mounting assembly, it is advantageous when at least one of the parts to be connected is preferably formed as a profile part, which is extruded or hollow extruded.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
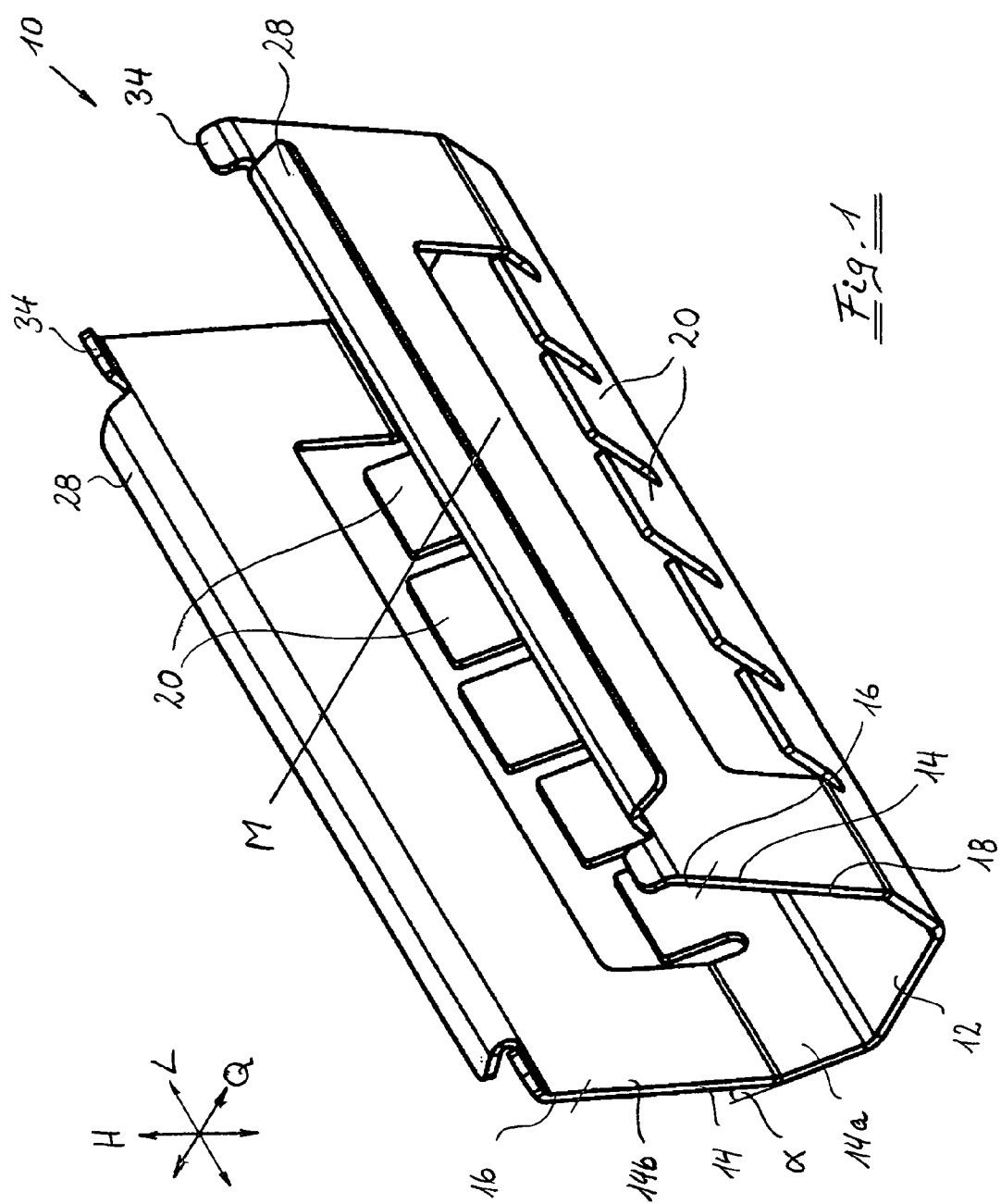
FIG. 1 is a perspective view of a connecting element in accordance with the present invention.

A connecting element in accordance with the present invention is identified in FIG. 1 as a whole with reference numeral 10. It is substantially U shaped. In other words it has a base leg 12, from which two lateral legs 14 extend upwardly. In general, the U shape can be described in that it has two free ends 16, that are connected with one another by means of a connecting region 18. If the general extension direction of the lateral legs 14 is identified as a height direction H and the general extension direction of the base leg 12 is identified as a transverse direction Q, then the connecting element 10 extends in the longitudinal direction L which is substantially orthogonal both to the height direction H and to the transverse direction Q.

As shown in FIG. 1, in the region of the lateral legs 14 of the connecting region 18 of the U shape of the connecting element 10, a plurality of tongs 20 are formed for example by stamping. They project from the respective lateral leg 14 on the side facing away from the other lateral leg 14 out of the U shape. These tongs 20 serve as barbs or first engaging elements (shown in FIG. 2) which engage the edge 22 of an undercut T-shaped groove 24 of a profile element 26, and thereby secure the connecting element 10 against pulling out from the T-shaped groove 24 in the height direction H. The profile element 26 forms the first part to be connected in the sense of the present invention.

In the embodiment shown in FIG. 1 five such tongs 20 are associated with each of the lateral legs 14 of the U shape. Two neighboring tongs 20 have a different length, so that it guarantees that in the case of great manufacturing tolerances at least the shorter of the tongs 20 can engage the edge of the T-shaped groove 24. Moreover, the tongs 20 have a symmetrical length distribution relative to the longitudinal center M of the connecting element 10, wherein the central tongs are the longest tongs and both outermost tongs are the shortest tongs. In this way a type of a crowned engaging surface can be obtained between the connecting element 10 and the profile part 26, which also during tilting of the connecting element 10 relative to the profile part 26 about the transverse axis Q secures a reliable engagement between the connecting element 10 and the profile part 26.

As can be further seen from FIG. 1, the connecting element 10 is formed as a stamped or bent part, preferably of spring steel. The extension of the tongs relative to the lateral legs 14 of the U shape can be maintained for example so that the lateral legs 14 have two leg portions 14a and 14b, which are angled relative to one another by a predetermined angle. The tongs 20 protrude outwardly completely in the plane or in the extension of the side leg portion 14a, so that they extend out relative to the side leg portion 14b extending substantially in the height direction H.

Figure 2:
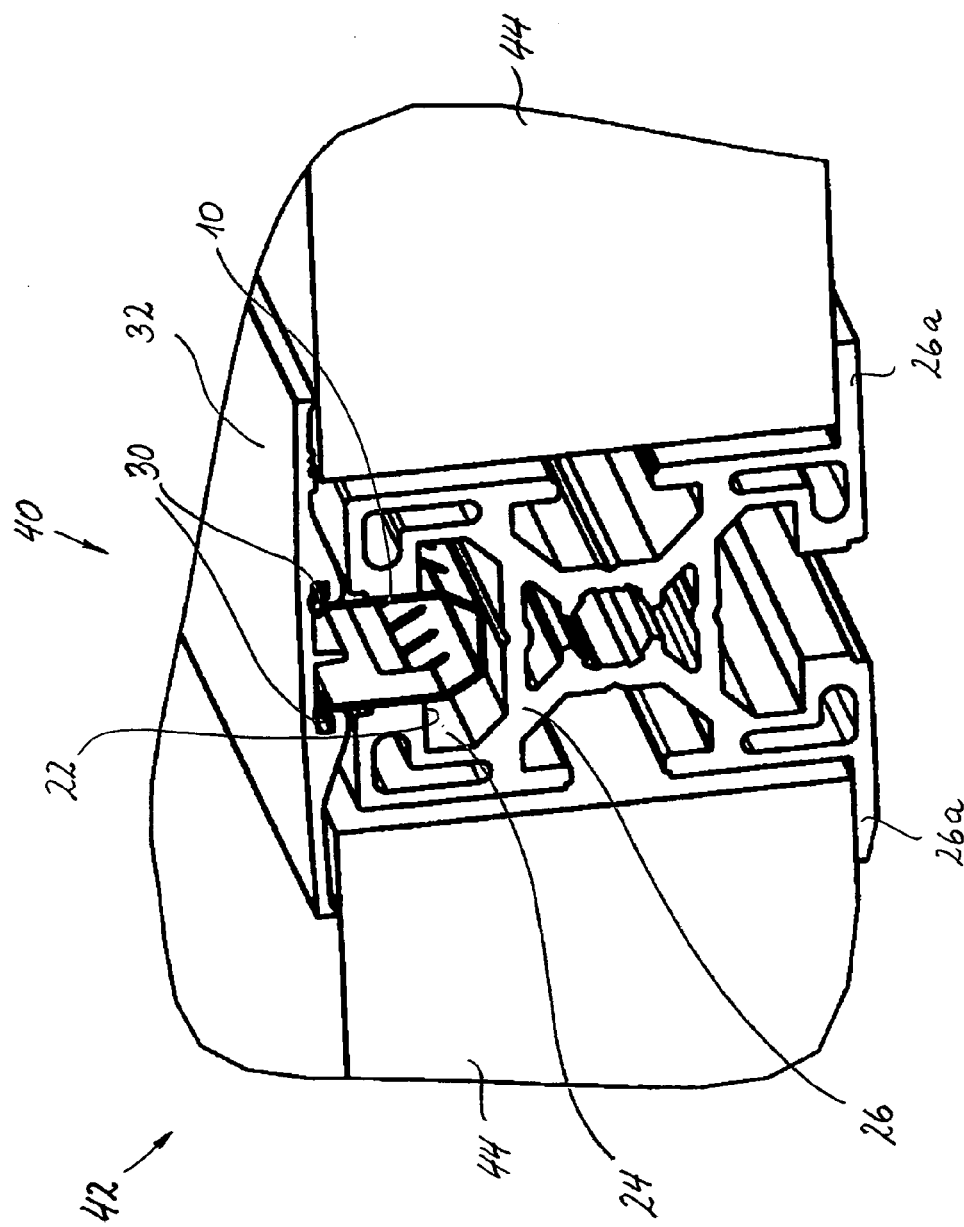
FIG. 2 is a perspective partial view of a mounting assembly provided with the connecting element in accordance with the present invention and used in a wall covering construction.

In the region of the free ends 16 of the U shape the lateral legs 14 are bent over a part of the length of the connecting element 10 outwardly, or in other words in directions away from one another and form the second engaging elements 28, which as shown in FIG. 2,engage in lateral recesses 30 of a further profile element 32. This further profile element 32 forms the second part to be connected in the sense of the present invention.

For stabilization of the engagement of the engaging elements 28 in the lateral recesses 30, the connecting element 10 in the region of its both longitudinal ends on both lateral legs 14 has third engaging elements 34. They are supported on the profile parts 32 so that they spread the second engaging elements 28 in the lateral recesses 30 of the profile part 32.

As shown in FIG. 2, the mounting assembly 40 which is composed of the first profile part 26, the second profile part 32, and the connecting element 10, can be used for example in the region of a wall covering 42. The first profile part 26 forms, with its both formed flanges 26a, a supporting profile for wall elements 44. The undesirable release of the wall elements 44 from the supporting profile 26 is prevented by the further profile element 32 acting as a roof profile, that is mounted on the supporting profile 26 by means of the connecting element 10.

Figure 3:
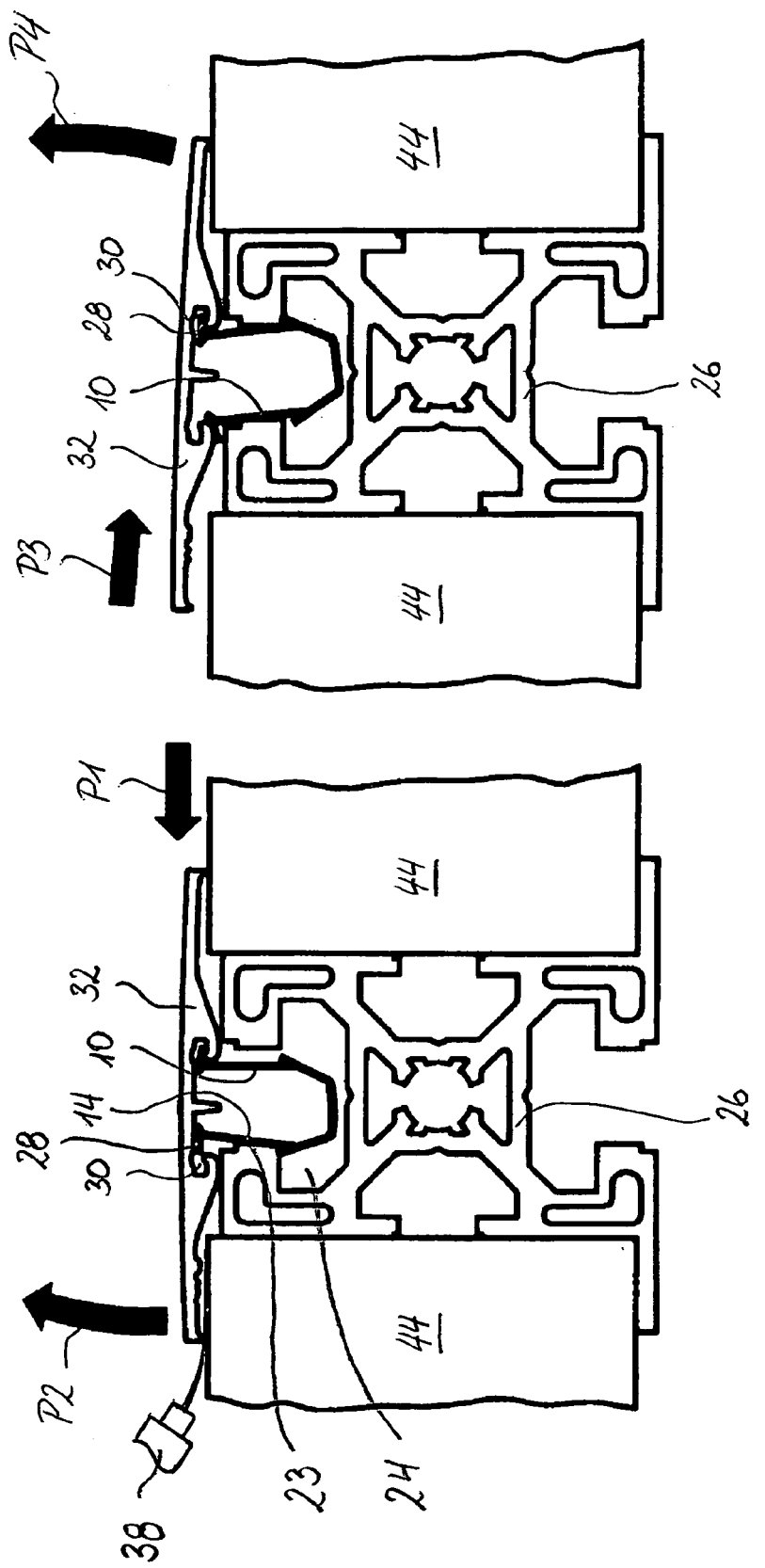
FIG. 3 shows two end views for illustrating a possibility of dismounting of the wall covering construction of FIG. 2.

In order to provide passages for supply and withdrawal conduits in the wall covering 42 in a simple manner later, it is advantageous when the wall covering 42 can be again dismounted. FIG. 3 shows a method which can be used for the dismounting without utilization of a tool.

First the further profile part 32 is displaced relative to the profile part 26 laterally, for example to the left in FIG. 3 as identified with the arrow P1. The left lateral leg 14 of the U shape of the connecting element 10, which is the forward leg as seen in the displacement direction in FIG. 3, comes into abutment against the lateral edge 23 of the T-shaped groove 24. During a further lateral displacement of the profile part 32 this free leg 14 in the course of the abutment bends so that the second engaging element 28 of the connecting element 10 associated with this leg 14 is moved from the lateral recess 30 of the profile part 32 associated with it. This condition is shown in the left partial view of FIG. 3. By lifting of the associated edge of the profile part 32 (arrow P2) it can be prevented that during back movement of the profile part 32 to the right in FIG. 3, the second engaging element 28 of the connecting element 10 is again guided back into the lateral recess 30.

For releasing the other second engaging element 28 also from the associated lateral recess 30, the profile part 32 is displaced in the opposite direction, or in other words to the right in FIG. 3 (arrow P3), and the profile part 32 finally is lifted from the profile part 26 (arrow 4).

Now the connecting element 10 is located in engagement with the T-shaped groove 24 only with its connecting region 18. This engagement can be released in a simple manner by compressing the free ends 16 of the lateral legs 14 of the U shape, or with use of a suitable tool, so that the connecting element 10 can be easily pulled from the T-shaped groove 24.

Alternatively, for dismounting also a spatula-like tool 38 can be used, which first is inserted with its blade on one side of the profile part 32 (as shown in the left picture of FIG. 3) and subsequently on the other side of the profile part 32 between both profile parts 26 and 32 and acts on the respective lateral leg 14 of the connecting element 10, so that the respective second engaging element 28 is moved out of the associated lateral opening 30.

Figure 4:
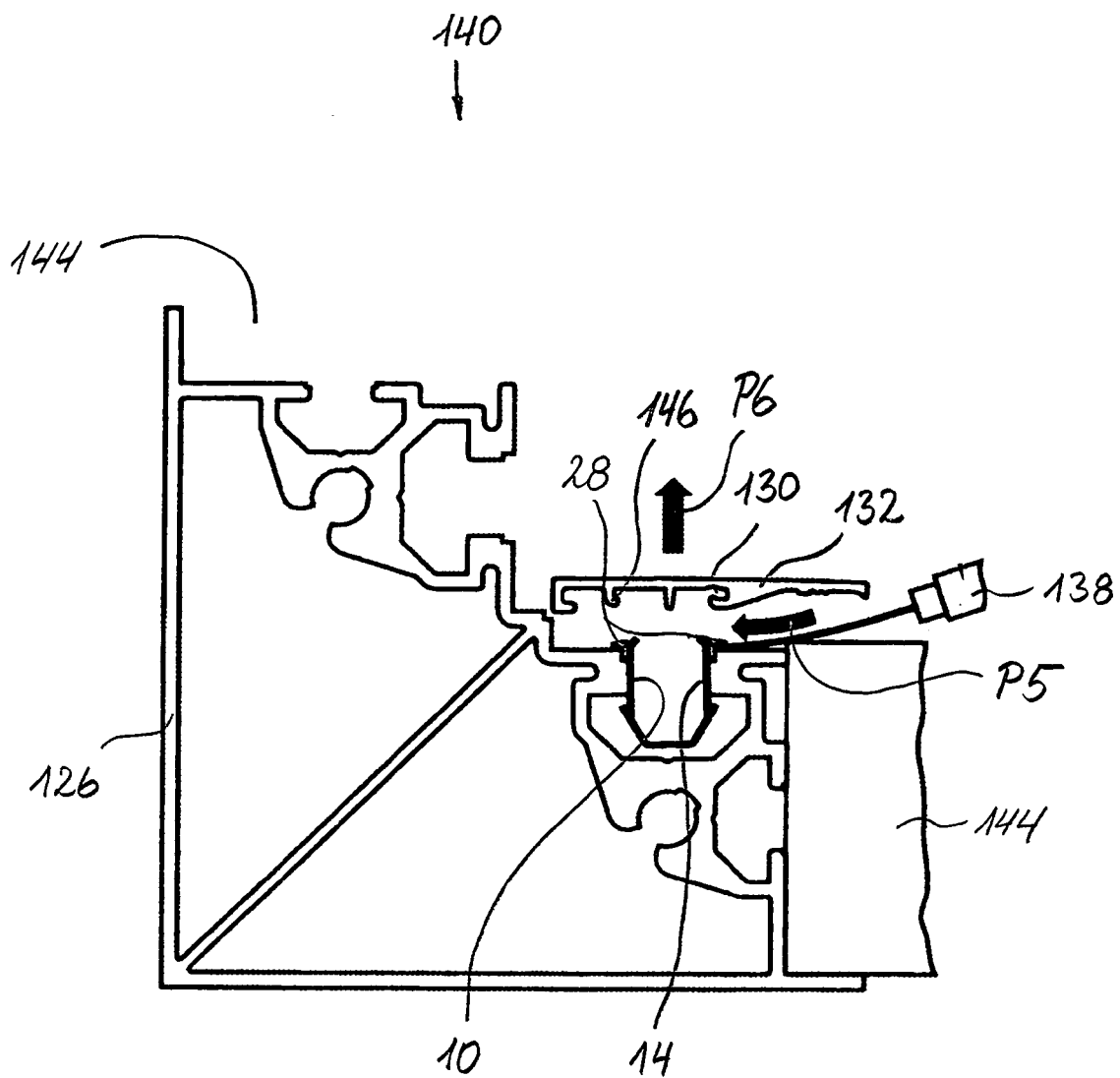
FIG. 4 is an end view of a second embodiment of the mounting assembly in accordance with the present invention.

A mounting assembly 140 shown in FIG. 4 differs from the mounting assembly 40 shown in FIG. 2 basically in that the first profile part 126 is formed as an angle profile. In other words, both wall covering elements 144 include an angle of substantially 90° with one another. A further difference resides in the form of the second profile part 132. It is available only via a lateral recess 130, which is arranged on the side of the connecting element 10 facing toward the associated wall covering element 144. For the second engaging element 28 of the connecting element 10 facing away from the wall covering element 144 there is no such lateral recess 130, but instead only a supporting web 146.

The dismounting in this case can be performed for example by a spatula-like tool 138, or in other words a tool with a flat blade, that is displaced from the wall covering element 144 under the second profile part 132 (arrow P5), until it reaches an abutment against the right lateral leg 14 of the connecting element 10 in FIG. 4. By means of the tool 138, the right second engaging element 28 of the connecting element 10 in FIG. 4 can be lifted from the associated lateral recess 130 of the second profile part 132. Finally, the second profile part 132 can be lifted in direction of the arrow P6 from the first profile part 126 and the connecting element 10.

It will be understood that each of the elements described above, or two or more together, may also find a useful application in other types of constructions differing from the types described above.

While the invention has been illustrated and described as embodied in a connecting element, and a mounting assembly using the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

The invention claimed is:

1. A connecting element with a substantially U-shaped cross-section, comprising a U shape having two opposite lateral legs with free ends and a connecting region connecting said free ends with one another, said connecting region being formed to be inserted into an undercut groove of a first part to be connected by the connecting element, the U shape further having at least one first engaging element provided and formed to releasably engage an associated edge of said undercut groove, the U shape having at least one second engaging element located near one of said free ends and provided and formed to releasably laterally engage in an associated recess of a second part to be connected by the connecting element, wherein said at least one second engaging element protrudes from an associated one of said free ends of the U shape in a direction away from the other of said free ends of the U shape, wherein said at least one first engaging element has a plurality of engaging tongs, which outwardly protrude from the U shape in a direction facing toward said free ends of the U shape, so that said two pluralities of engaging tongs are located at opposite sides of the U-shape, and each plurality of engaging tongs being associated with only one respective edge of the undercut groove of said first part for a barb-like engagement therewith, wherein at least two of said engaging tongs of each of said two pluralities of engaging tongs at each side of the U-shape have different lengths to compensate for manufacturing tolerances of the undercut groove of the first part to be connected.

2. A connecting element as defined in claim 1, wherein the plurality of engaging tongs is associated with a common edge of the undercut groove of the first part.

3. A connecting element as defined in claim 2, wherein said U shape has two legs, each extending from a free end to said connecting region, wherein each leg is provided with a plurality of engaging tongs associated with edges of the undercut groove of the first part, wherein each leg has engaging tongs of different lengths.

4. A connecting element as defined in claim 1, wherein said engaging tongs have a longitudinal distribution which is symmetrical relative to a longitudinal center of the connecting element.

5. A connecting element as defined in claim 1, wherein said at least second engaging element is associated with each of said free ends of the U shape.

6. A connecting element as defined in claim 1, wherein said at least one second engaging element is formed as an edge portion of a respective one of said free ends.

7. A connecting element as defined in claim 6, wherein said edge portion of said one free end is bent.

8. A connecting element as defined in claim 6, wherein said edge portion extends substantially over a whole length of the connecting element.

9. A connecting element as defined in claim 1, wherein at least one of said free ends of the U shape has at least one third engaging element which includes a predetermined angle with said at least one second engaging element.

10. A connecting element as defined in claim 9, wherein said at least one third engaging element includes with said at least one second engaging element an angle between 70° and 140°.

11. A connecting element as defined in claim 10, wherein said angle between said at least one third engaging element and said at least one second engaging element is 90°.

12. A connecting element as defined in claim 9, wherein said at least one third engaging element is formed as a projection which extends substantially in an extension of a lateral leg of the U shape associated with said one free end.

13. A connecting element as defined in claim 9, wherein said at least one third engaging element is provided on at least one longitudinal end of said one free end of the U shape.

14. A connecting element as defined in claim 1, wherein the connecting element is substantially mirror-symmetrical relative to a longitudinal central plane of the U shape.

15. A connecting element as defined in claim 1, wherein the connecting element is elastic.

16. A connecting element as defined in claim 15, wherein the connecting element is resilient.

17. A connecting element as defined in claim 1, wherein the connecting element is composed of a material selected from the group consisting of metal and plastic.

18. A connecting element as defined in claim 17, wherein the connecting element is composed of the metal which is spring steel.

19. A connecting element as defined in claim 1, wherein the connecting element is formed as a part selected from the group consisting of a stamped part and bent part.

20. A mounting assembly, comprising a first part and a second part to be connected, said first part having an undercut groove, said mounting assembly further comprising a connecting element for releasably connecting said first and second parts, said connecting element including a U shape having two opposite lateral legs with two free ends and a connecting region connecting said free ends with one another, said connecting region being formed to be inserted into said undercut groove of said first part to be connected by the connecting element, said U shape further having at least one first engaging element provided and formed to releasably engage an associated edge of said undercut groove, the U shape having at least one second engaging element located near one of said free ends and provided and formed to releasably laterally engage in an associated recess of said second part to be connected by the connecting element, wherein said at least one second engaging element protrudes from an associated one of said free ends of the U shape in a direction away from the other of said free ends of the U shape, wherein said at least one first engaging element has two pluralities of engaging tongs which outwardly protrude from the U shape in a direction facing toward said free ends of the U shape, so that said two pluralities of engaging tongs are located at opposite sides of the U shape, and each plurality of engaging tongs being associated with only one respective edge of the undercut groove of said first part for a barb-like engagement therewith, wherein at least two of said engaging tongs of each of said two pluralities of engaging tongs at each side of the U-shape have different lengths to compensate for manufacturing tolerances of the undercut groove of said first part to be connected.

21. A mounting assembly as defined in claim 20, wherein at least one of said parts is composed of a material selected from the group consisting of light metal and a light metal alloy.

22. A mounting assembly as defined in claim 21, wherein said at least one part is composed of a material selected from the group consisting of aluminum and an aluminum alloy.

23. A mounting assembly as defined in claim 21, wherein said first part is composed of said material selected from the group consisting of light metal and a light metal alloy.

24. A mounting assembly as defined in claim 20, wherein at least one of said parts is composed of plastic.

25. A mounting assembly as defined in claim 24, wherein said second part is composed of plastic.

26. A mounting assembly as defined in claim 20, wherein at least one of said parts is formed as a profile part.

27. A mounting assembly as defined In claim 26, wherein said profile part is formed as a part selected from the group consisting of an extruded profile part and a hollow extruded profile part.

28. A mounting assembly as defined in claim 20, wherein the plurality of engaging tongs is associated with a common edge of the undercut groove of the first part.

29. A mounting assembly as defined in claim 28, wherein said U shape has two legs, each extending from a free end to said connecting region, wherein each leg is provided with a plurality of engaging tongs associated with edges of the undercut groove of the first part, wherein each leg has engaging tongs of different lengths.

* * * * *